Patented Nov. 23, 1948

2,454,716

UNITED STATES PATENT OFFICE 2,454,716

TREATING ANIMAL TISSUE

John M. Ramsbottom and Levi Scott Paddock, Chicago, Ill., assignors to Swift & Company, Chicago, Ill., a corporation of Illinois No Drawing. Application June 18, 1945, Serial No. 600,220

16 Claims. (Cl. 99—175)

This invention relates to the treatment of animal tissues and has to do particularly with the treatment of flesh and intestines with plant enzymatic material to improve the value thereof.

One of the objects of this invention is to provide a method whereby animal tissue may be rendered tender and improved in other properties.

Another object of this invention is to provide a method whereby the flesh of edible animal carcasses may be rendered tender.

Another object of this invention is to provide a method whereby animal intestines may be rendered tender and more adaptable for use as sausage casings.

Another object of this invention is to provide a method of treating natural sausage casings to increase the stretchability of the casings and to increase the stuffing capacity of the casings.

Another object of this invention is to provide a method whereby the smoking properties of the casings may be altered.

Another object of the invention is to provide a method whereby such tough casings as hog casings and Indian sheep casings may be tendered to any desired extent and rendered useful in the manufacture of high grade sausage products which require a tender casing.

Still another object of the invention is to so alter normally tough meat and other animal tissue as to render the same substantially more tender and, therefore, more fit for human consumption.

A further object of the invention is to provide meat and animal casings which have been treated so as to materially improve the physical properties thereof, and which in particular have had the tenderness properties thereof greatly increased.

A further object of the invention is to provide a tenderized natural casing for use in making sausages and the like.

A still further object of the invention is to provide a hog, beef and/or Indian sheep casing having a tenderness at least equal to that of untenderized domestic sheep casings.

Another object of the invention is to provide hog casings, Indian sheep casings, etc., having a tenderness greater than that of untenderized or untreated domestic sheep casings.

Another object of the invention is to so modify the tissue of certain animal casings heretofore considered unsatisfactory for making sausages and the like as to render the same of the same usefulness as domestic sheep casings.

Still another object of the invention is to render the manufacture of sausages and the like more economical by making it possible to utilize in such manufacture inherently tough natural casings which were heretofore considered unsatisfactory for the purpose.

Another object of the invention is to provide an improved method of arresting the action of the enzyme material after the desired extent of tenderizing of the animal tissues has been accomplished.

Still another object of the invention is to utilize the enzyme arresting action of ultraviolet light to stop the tenderizing action of enzymes upon animal tissue after the desired tenderness has been produced.

A still further object of the invention is to provide meat tissue and natural casings which have been tenderized by treatment with enzyme material.

Another object of the invention is to treat natural or animal casings with enzymes before stuffing to condition the casings for tenderizing.

Another object of the invention is to treat unstuffed animal casings with a proteolytic enzyme whereby the enzyme becomes associated with the casing and is effective for tenderizing the casing when the casing is subjected to heat.

Another object of the invention is to treat unstuffed animal casings with a proteolytic enzyme whereby the enzyme becomes associated with the casing and then salting the casing to preserve the casing and arrest the action of the enzyme.

Another object of the invention is to treat unstuffed animal casings with a proteolytic enzyme whereby the casings are partially tenderized without weakening the casings to a point to interfere with stuffing and then arresting the action of the enzyme.

Another object of the invention is to provide an improved method of preparing cooked sausages wherein raw animal casings are treated with a proteolytic enzyme before stuffing and cooking.

Another object of the invention is to treat unstuffed natural casings with a proteolytic enzyme whereby the stuffing properties of the casing are improved and the casings are conditioned for tenderizing and then storing the casings under conditions to arrest the action of the enzyme during storage.

Other objects and advantages of this invention will become apparent from the description and claims which follow.

The process is applicable to the treatment of various types of animal tissue, such as wholesale or retail cuts of meat, including beef and pork. It is also applicable to the treatment of meat in various degrees of comminution, such as hamburger, sausage and the like. The treatment of sausage may take place before or after the meat is stuffed into casings.

The invention is particularly adaptable to the treatment of hog casings, Indian sheep casings, and beef casings although it is not limited to the treatment of these specific types of materials.

Natural casings, as distinguished from artificial or synthetic casings, are prepared from the intestines of edible animals, such as cattle, swine and sheep. After the intestines are removed from the carcass, they are cleaned and a tubular membrane appropriate for sausage casings is obtained.

Sheep casings command a higher price because they generally possess more desirable physical properties than hog casings, Indian sheep casings and beef casings. Hog casings are suited for the manufacture of frankfurters and other sausages similar in size, but because of physical characteristics they cannot be successfully used in the manufacture of high grade frankfurters and fresh pork sausages because the casing is objectionable, being difficult to masticate. The same is true of Indian sheep casings and beef casings. Moreover, the casing is the most difficult part of the sausage to digest, and it is also highly desirable to have a casing possessing a greater stretchability so that the ratio of casing to sausage meat may be reduced to as low a point as possible.

The present invention contemplates the treatment of animal tissue including natural casings prepared from animal intestines with a solution of a proteolytic enzyme obtained from an animal source, such as pepsin or trypsin or from a plant, such as plant juice or extract containing a proteolytic enzyme, and controlling the action of the animal or plant enzyme on the tissue in such a way that the desired physical properties of the tissue are improved efficiently and quickly without undue digestion or other undesirable effects.

The invention also contemplates treating natural casings before stuffing with a proteolytic enzyme to tenderize the casings or to condition the casings for tenderizing after stuffing and controlling the action of the enzyme whereby the stuffing properties of the casing are not impaired or are improved.

We are aware that it has been proposed heretofore to treat meat with certain enzymes to obtain tendering. For example, the patent to Paddock, et al., United States Patent No. 2,043,392, discloses the injection of proteolytic enzymes into the vascular system of carcass beef and then holding the treated product under refrigeration. There is no disclosure in that patent of treating natural casings with an enzyme nor the treatment of animal tissue under the conditions of the present invention whereby applicants' results could be obtained. The patent to Marcano, United States Patent No. 441,181, discloses the preparation of a meat peptone in which the meat is completely disintegrated into a liquid or soluble pasty form. The Marcano patent has no disclosure of tendering any kind of animal tissue.

According to the present invention, animal tissue is treated with a proteolytic enzyme solution under conditions of treatment including strength of the enzymic solution, temperature, and time, coupled with steps of operation whereby new and different results from the prior art are obtained.

The proteolytic enzymes and their solutions are generally prepared from fresh or frozen enzymic plant juices or extracts, which have not been subjected to a temperature sufficiently high to destroy the enzymic action. Included among the plant juices and the corresponding proteolytic plant enzymes which may be employed in the present process are milkweed juice containing asclepain, papaya juice containing papain, pineapple juice containing bromelin, fig juice containing ficin, osage orange juice containing macin and mushroom juice containing mushroom proteolytic enzyme. The natural plant juices containing a proteolytic enzyme and/or mixtures thereof are usually employed in preparing the treating solution, but other solutions of the plant proteolytic enzyme or enzymes can be used. Solutions containing about 1 part of enzymic plant juice to about 5 or 6 parts or more of water are often used under the conditions of treatment herein specified, although satisfactory results may be obtained by using undiluted extracts or extracts diluted with water up to about 200 parts of water. The concentrations vary with the nature of the tissue treated, the activity and type of enzyme employed, and the other conditions such as time, temperature and method of operation.

The enzymic juice or extract may be obtained by pressing the fruit in the case of the pineapple, osage orange, papaya and fig enzymes. The mushroom enzyme juice may be obtained by pressing the plant. The milkweed, osage orange, papaya and fig enzyme extract may be recovered by pressing the fresh leaves, stems, stalks and sap wood of these plants. The proteolytic plant enzyme may be isolated from the appropriate juice or extract source by any method suitable for the isolation of a proteolytic enzyme. These methods include precipitation with ethyl alcohol, acetone, methyl alcohol, salts and the like. Solutions containing the natural proteolytic plant enzyme juice, for example, papaya juice, milkweed juice and/or pineapple juice, in concentrations of a fraction of a per cent to 100% may be satisfactorily employed. Corresponding solutions of the isolated enzyme may contain as low as 0.002% of the enzyme or even lower, and as high as 5% or more of the enzyme. For example, a solution containing preparations of about 0.005 to 0.05% of the enzyme is generally satisfactory, although solutions containing active plant enzymes in larger amounts, for example 0.05% to 0.5% or more are contemplated for our use. Solutions of the lower range are usually used for treating meat. Solutions of the higher range, approximately 10 times the concentration for tenderizing meat, are more satisfactory for treating intestinal tissue, such as natural casings.

Animal enzymes which hydrolyze proteins that may be used in our invention include the proteinases having optimum activity in an acid medium and proteinases having optimum activity in an alkaline medium. Examples of proteinases having optimum activity in an acid medium which may be used are pepsin and cathepsin. Pepsin occurs, for example, in the fresh stomachs of healthy pigs. While cathepsin or autolytic proteinase may occur naturally in some meat products, it is not present at all or not present in sufficient amount in casings to have any substantial action for applicants' purpose. An example of proteinase having optimum activity in an alkaline medium is trypsin which occurs in the pancreatic juice. Pepsin and trypsin may be isolated as powders which are at least partially soluble in water. A single enzyme or a mixture of two or more enzymes in water or other suitable solvent or a mixture of solvents, each containing a single enzyme, may be used.

In the use of solutions of the plant enzymes it has been found that these proteolytic enzymes are generally most active when employed in a solution having a hydrogen ion concentration approximating that of the extract or juice. However, these enzymes are active when used in solutions varying over a wide range of hydrogen ion concentrations, e. g., a pH between about 3 or 4 and 8.5. It is advantageous to maintain the pH value below 7 for maximum enzyme activity, for advantages in dye absorption by the products, and, particularly, for treating meat and stuffed sausages in order to avoid an alkaline reaction on the meat which would stimulate undesirable bacterial growth.

In the use of solutions of the animal enzymes, there are certain optimum pH values at which the enzymes are most active. The optimum pH value for cathepsin is about 4.5 to 6.5, for pepsin about 1 to 3, and for trypsin about 7 to 9. In the case of pepsin somewhat broader pH ranges may be used, for example, from about 1 to 5.

The natural juice or other solution of proteolytic enzymes may be applied to the tissue in any suitable manner as by washing, soaking, injecting, spraying, dipping or wiping.

It will be understood that the time of treatment, the temperature of treatment, and the concentration and activity of the solution are all variable and should be adjusted to secure the desired extent of tendering, which is dependent upon the type and the initial toughness of the tissue. The activity of the proteolytic enzyme increases with increasing temperature until a condition of greatest activity is generally reached at temperatures between about 140° and 160° F. The enzyme activity is destroyed at a temperature between about 160° and 185° F. These temperatures vary slightly with the different enzymes. For example, papain or papaya juice is operative at slightly higher temperatures, e. g., 175° F., whereas the mushroom enzyme may sometimes be inactivated at temperatures of about 150° to 160° F.

The product previously treated with the enzyme by any of the methods described hereinbefore is subjected to a temperature within the range of enzyme activity but above refrigeration temperatures, preferably between 60° and 140° F. and maintained at such temperatures in contact with the previously applied proteolytic enzyme for a sufficient length of time to permit the enzyme to act upon the tissue, whereby the desired alteration in physical properties is effected. The temperature may then be raised to a point sufficiently high, for example, to a temperature between about 165° and 185° F. to inactivate the enzyme and avoid excessive action on the tissue. As an alternative method, the treated product may be thoroughly flushed with water before or after the final heat treatment to remove the major portion of the enzymic material. The action of the enzyme may be terminated by other means than heating or washing, such as the application of a suitable chemical reagent. We have discovered that this enzymic action may also be arrested by exposure of the enzymic treated animal tissue to ultraviolet light in a manner hereinafter set forth.

In the treatment of meat tissue the enzyme solution may be applied to the meat by any of the foregoing methods. The previously treated meat is then held at a temperature of above about 60° F. and within the range of enzymic activity until the desired degree of tenderization takes place. The temperature of the meat is then raised to a point at which the treating enzyme is substantially inactivated. This tenderization process may be accomplished by gradually heating the meat to which the enzyme has been applied from room temperature to cooking temperature and finally enzyme inactivation temperature. The temperature rise through the gradient is at such a rate that the meat is tenderized by the enzyme in its active range. When the desired degree of tendering results, the temperature is substantially raised to stop further enzymic action. The type, toughness and size of the meat cut, and the quantity and activity of the enzyme, determine the time and temperature of heat treating.

As an illustration of the tenderizing of meat by this process, a normally tough muscle from the hind shank of the right side of a beef carcass (peroneus tertius) was treated with an enzyme solution containing preparations of about 0.012% asclepain, 0.012% papain, 0.008% ficin, 0.015% macin, 0.035% bromelin or 2% mushroom enzyme by injecting the solution into the primary artery supplying the circulatory system of the cut. The amount of enzyme solution injected was about 8% of the muscle weight. An enzyme-treated right side muscle and a non-treated control left side muscle were cut into slices about one-half inch thick. These slices were heated gradually from room temperature to a temperature of about 160° F. in about 10 to 15 minutes. The enzyme was then inactivated by quickly raising the temperature substantially above this value. The cooked, treated product was compared with the cooked control. In all cases the treated muscle slices were tender whereas the control muscle slices were tough.

It is possible to similarly prepare treated beef rounds to obtain steaks and roasts which when heat treated first in the active enzyme temperature range followed by a high heat treatment to inactivate the enzyme will yield cooked cuts substantially more tender than those not so treated with enzymes. In all these treatments the steaks and roasts are fried, broiled or roasted to an inside temperature of at least 160° F. and tenderness comparisons made on the cooked meat. Of course with these larger cuts longer periods of treatment, for example, up to 1 hour or more, are generally necessary in order to raise the temperature throughout the meat, through the active enzyme range.

In treating the beef rounds the enzyme solution alternatively may be introduced into the cut by means of hypodermic needles until the desired amount of enzyme solution based on the weight of muscle is obtained. For example, an aqueous solution containing preparations of about 0.012% asclepain, 0.05% mushroom enzyme, 0.012% papain, 0.005% facin, 0.015% macin, or about 0.035% bromelin or an equivalent dilute plant juice may be injected by needles into the cuts of meat or into the circulatory system of a meat cut or a carcass in an amount equal to about 6% of the weight of the meat to prepare it for the heat tenderizing treatment.

In the treatment of sausage casings, the natural juice or other solution of proteolytic plant enzyme may be applied to the casing in any suitable manner as by washing or soaking the casings in the solution, adding the enzyme or juice to the sausage cook water or spraying, dipping or wiping the casing with the enzyme solution or juice after the casing has been stuffed with sausage meat. The casing may be treated, however, before or after stuffing and greater improvement in the stretchability is sometimes obtained by treatment before stuffing.

The casing with the applied enzyme may be heated to a temperature above about 60° F., for example, between about 110° and 140° F., and maintained at such temperature for a sufficient length of time to permit the enzyme to attack the tissue to the desired extent, e. g., ½ to 3 hours. The temperature is then raised to a point high enough to destroy the major portion of the enzyme and avoid excessive action on the casing. The improvement of the stuffed casing by this enzymic action is preferably accomplished in two steps; a conditioning of the stuffed casing at a lower temperature, e. g., 80° to 90° F., followed by the smoking of the stuffed casing at a higher temperature, after which the enzyme is inactivated, e. g., by cooking. In some instances it may be desirable to omit the separate tempering or conditioning step and to secure the conditioning and smoking in a single operation. When the conditioning and smoking take place in one operation the temperature in the smoke house may be raised through a wide range, at least a portion of which is in the field of enzymic activity, and the temperature rise through this gradient may be rather slow.

The present invention may be practiced by treating the casings after stuffing as well as before stuffing. In the treatment of casings after stuffing, basins or receptacles may be placed at the end of a conventional stuffing table. One basin is equipped with an overflow and warm water is passed continuously through the basin; the other basin may serve as a receptacle for the juice or juices or other solution of proteolytic plant enzyme or enzymes. A satisfactory aqueous solution may be prepared containing preparations of about 0.12% asclepain, 0.12% papain, 0.08% ficin, 0.15% macin, or 0.5% mushroom enzyme, or an equivalent quantity of plant juice, e. g., 15% pineapple juice. The concentration and activity of the solution will vary with the type of casing which is to be treated but the above values are good for average production. The enzyme solution is then placed in the proper receptacle. After the sausages are stuffed and linked, the operator dips the sausages in the warm running water basin, immersing the sausages 2 or 3 times to rinse off particles of meat from the surface of the casings. The sausages are then immersed 2 or 3 times in the enzyme solution, care being taken to have the solution reach all portions of the outside surface of the casings. In the commercial treatment of natural casings, we prefer to spray the stuffed casings with one of the foregoing aqueous enzyme solutions containing about 0.1% pepsin, trypsin, papain, ficin or asclepain, 0.5% mushroom juice enzyme, or about 0.35% bromelin.

It will be understood, of course, that the time of treatment, the temperature of treatment, and the concentration and activity of the solution are all variable and may be adjusted at will to secure the desired alterations in the physical properties of the casings, and are depending upon the use to which the casings are to be put and the initial properties of the casings.

After the application of one of the enzyme solutions by any of the foregoing methods, the product with the enzyme or enzymes thereon may be placed in a tempering room for a period of about 1 hour and 30 minutes with an air temperature of from 80° to 120° F., preferably about 80° to 90° F., and a relative humidity of about 80% to 85%. The product is then removed to a preheated smoke house having temperatures sufficiently high to cure the product, for example, at a temperature of from 120° to 170° F. The product is usually kept in the smoke house for about 45 minutes up to 1 or 2 hours, during which time a gradual increase in temperature from about 120° to 150° or 160° F. may be obtained over a period of about 1½ hours. The air temperature, if desired, may then be raised to 170° to 200° F., for example, to a temperature of about 170° F. and maintained at this temperature for about 15 minutes. Preferably after the curing operation, the product may be cooked in water or steam in which case it is desirable not to exceed a temperature of about 180° F. The preferred cooking treatment, however, is to place the frame with the smoked sausage links in a cooking chamber where the sausages are sprayed with hot water at a temperature of about 170° F. for about 12 to 15 minutes, thereby inactivating and removing the enzymes. A direct steam chamber at the same temperature may be employed.

The treatment of natural casings according to the present invention produces a product of greatly improved tenderness. For example, ordinary untreated casings are often so tough that it is difficult to break or puncture a stuffed sausage by bending, biting, chewing or pulling, whereas the casings treated by the present invention are easily broken by bending and may be readily punctured by gentle pressure with a finger or thumb.

The improvement in and uniformity of tenderness of the treated casings may be more precisely shown by penetrometer measurements of the force necessary to puncture a sausage casing. The penetrometer consists of a steel ball having a diameter of $\frac{5}{16}$-inch mounted upon a rod having a smaller diameter which is attached to a pressure gauge. A measure of the toughness of the casing may be obtained by puncturing the stuffed casing with the steel ball. In the particular penetrometer employed in testing the sausage casings, the scale was calibrated in one-twentieths of a pound. The following data illustrate representative penetrometer readings obtained by puncturing untreated casings and treated casings prepared as described above, employing the pineapple juice diluted with about 6 parts of water:

| Untreated Casings | Treated Casings |
|---|---|
| 92 Penetrometer reading | 54 Penetrometer reading |
| 74 Penetrometer reading | 56 Penetrometer reading |
| 88 Penetrometer reading | 63 Penetrometer reading |
| 86 Penetrometer reading | 53 Penetrometer reading |
| 75 Penetrometer reading | 63 Penetrometer reading |
| 84 Penetrometer reading | 56 Penetrometer reading |

The deviation in penetrometer readings of the untreated casings was 18 whereas the deviation in the case of the treated casings was 10. The data represent quite clearly that the treatment of the casing results in a far more uniform as well as tenderer product. By way of further interpretation of the above data on penetrometer tests, it will be noted that the average reading for untreated casings is 83.16, whereas the average reading for treated casings is 57.5. Calculated in percentage, the resistance to penetration by the $\frac{1}{16}$-inch diameter steel ball was about 31% less for the treated casings than for the untreated casings. In other words, the sausages with treated casings offered about one-third less resistance to penetration by the ball than like sausages having untreated casings.

In a more comprehensive test of other groups of casings similar results were obtained. In a statistical analysis of these data, it was found that the standard deviation between treated casings is about one-half as great as the standard deviation between untreated casings. The following table illustrates the results obtained in tests of 140 samples of treated casings and untreated casings:

| No. of Samples | Character of Samples | Average Reading | Standard Deviation |
|---|---|---|---|
| 140 | Treated | 75.7 | 11.9 |
| 140 | Untreated | 122.2 | 22.8 |

If the resistance to penetration is calculated on the basis of the above average readings, it will be found that the treated casings offered about 38% less resistance to penetration than similar untreated casings. Again, the treated casings were roughly about one-third less resistant to penetration than untreated casings graded to the same size.

In the treatment of unstuffed casings, the cleaned casings prepared from the intestines of animals are subjected to a preliminary treatment with the enzyme to condition the casing as by immersing the casings in a solution of the enzyme. The preliminary treatment is carefully controlled and the treatment terminated before the casings are disintegrated or rendered too weak for stuffing. The conditioning treatment may be carried out in several ways depending on the conditions maintained. The degree of action of the enzyme on the casing will vary with the time and temperature of treatment, and the strength of enzyme solution. We have found that the enzyme becomes associated with the casing and thereafter the degree of tenderizing will depend on the treating conditions. Partial or complete tenderization may be obtained. If it is intended to secure the major portion of the tenderization after stuffing the treated casings, the degree of action of the enzyme on the unstuffed casing may only be sufficient to cause the enzyme to become firmly associated with the casings. We prefer to use conditions wherein at least partial tenderization appears to occur. When the casings are to be stuffed and cooked the degree of tenderization before stuffing is unimportant so long as the casings are not weakened sufficiently to interfere with the stuffing operation.

One method of operation is to pretreat the unstuffed casings, terminate the treatment and then store the casings. If the casings are sufficiently tenderized, the enzymic action may be arrested whereby the enzymes are destroyed or inactivated, for example by chemicals, such as hydrogen peroxide or heat. When the pretreatment merely conditions the casings for further tenderizing, as after stuffing, the conditioned casings may be treated to arrest the action of the enzymes whereby the enzymes are rendered dormant, for example by treatment with salt or by freezing. The treated casings may be stuffed when desired. Those casings which are completely tenderized may be stuffed to produce a finished product such as fresh pork sausage. Sausages prepared from casings which are merely conditioned but incompletely tenderized may be subjected to heat treatment to tenderize the casings. The enzymic action may thereafter be terminated by cooking or chemical action.

As an example of the treatment of natural casings before stuffing, a sample of medium hog casings was immersed in a solution of 1 part of pineapple juice and 15 parts of water for 2 hours at 80° to 90° F. with occasional agitation. The treated casings were then packed in salt and stored. After several weeks of storage the casings stuffed satisfactorily.

Another sample of medium hog casings was treated by immersing in a solution of 1 part of pineapple juice to 12 parts of water at 85° to 90° F. for 2 hours. The casings were then treated for 2 hours at 70° to 80° F. in a 0.5% solution of hydrogen peroxide. The casings thereafter were stuffed with ground sausage meat.

Smoked country sausage was prepared by treating medium hog casings with a solution of 1 part pineapple juice to 15 parts of water and held at 80° to 90° F. for 2 hours. The casings were then stuffed with ground sausage meat and the sausage smoked several hours while in the presence of heat until an inside temperature of the sausages of 137° F. was reached.

We have given in the three above examples conditions for practical operations but the conditions may be altered considerably and still obtain good results. For instance we may increase the concentration of the enzyme and shorten the time or lower the temperature; or we may leave the enzyme concentration the same and increase the temperature and shorten the time; or we may shorten the time and increase the concentration or temperature, and obtain good results. In other words the three variables, concentration, time, and temperature may be varied to obtain any result desired. For example, we can leave the concentration of the enzyme the same and treat the casings at 70° F. to 80° F. for 3 hours, or we can treat the casings at 90° F. to 100° F. for 1 hour. We can use temperatures as high as 115° F. providing the time is sufficiently shortened to about 15 or 20 minutes. We can also use temperatures of 60° or lower but above freezing temperatures providing the time of treatment is correspondingly increased.

The process of the present invention also produces other improved properties in the treated casing. Among these are increased translucency and improved smoking properties. These improved properties appear to be due at least in part to an increased quantity of water absorbed by the casing. The treatment of a casing with pineapple juice or a dilute aqueous solution of bromelin produces a noticeable tendency for the casing to swell accompanied by a marked increase in the amount of water absorbed by the casing. As a result, smoke penetrates the wet surface more rapidly and to a greater extent than the drier surface of an ordinary casing. Moreover, the casing dries out more slowly than an untreated casing and, as a result, provides a longer effective smoke period due to the more rapid and continued penetration of the smoke.

The increase in the water absorbing property of treated casings as compared to untreated casings may be illustrated by the data given below. Casings graded to the same size were selected, one group being handled in the normal conventional manner, the other group being treated in accordance with the present invention. In the treatment of the casings in accordance with conventional practice, the salted casings were soaked in water to remove the salt and were then flushed with water. The other group of casings was soaked in water for about 30 minutes to remove the salt, treated with a pineapple juice solution consisting of about 1 part of pineapple juice to 6 parts of water, held in contact with the applied enzyme at a temperature of from 70° to 75° F. for about 2 hours, and then flushed with water. The percentage gain in weight of the treated and untreated casings was found to be as follows:

| Untreated Casings, Per Cent Gain | Treated Casings, Per Cent Gain |
| --- | --- |
| 42 | 88 |
| 38 | 114 |
| 35 | 102 |
| 28 | 72 |
| 33 | 75 |
| 33 | 71 |
| Average 35 | Average 87 |

Thus, it is evident from the foregoing average percentages that the treated casings absorbed about 52% more water than the untreated casings, or, stated another way, about 2½ times as much water.

Furthermore, the treatment of natural casings in accordance with our invention increases the stretchability of the casings and thereby increases the stuffing capacity of the casings. In the data which follow, casings graded to the same size were handled as described above to prepare the casings for stuffing. All of the casings were then subjected to the identical stuffing operation, and, after stuffing, the diameter of the casings was measured. Each of the figures in the table which follows represents the average diameter of sausage prepared from a bundle of casings, each of the bundles containing 102 yards of casing.

| Untreated Casings | Treated Casings |
| --- | --- |
| Millimeters | Millimeters |
| 28.1 | 31.2 |
| 28.5 | 30.7 |
| 28.5 | 31.1 |
| Average 28.4 | Average 31.0 |

The sausages were also weighed to obtain the weight of sausage meat. The data in the table which follows represent the weight of the stuffed casing per standard bundle of 102 yards of casing.

| Untreated Casings | Treated Casings |
| --- | --- |
| Pounds | Pounds |
| 105.0 | 110.5 |
| 107.5 | 120.0 |
| 92.0 | 112.0 |
| Average 101.8 | Average 114.2 |

The increase in stuffing capacity in the foregoing groups of casings was approximately 11%. The increase in stuffing capacity will, in general, vary from about 8% to about 15%, depending upon the characteristics of the casings, concentration of the juice used, and upon the length of the period of treatment of the casings. The above data illustrate a representative increase in the stretchability and stuffing capacity of casings treated in accordance with this invention.

The treatment of the casings with the proteolytic plant juice or other aqueous solution of proteolytic enzymes renders the casings more slippery than conventional casings. Before stuffing, casings are placed upon or threaded on a stuffing horn and it is desirable to have the casing as slippery as possible so that it may be easily threaded on the stuffing horn. In conventional practice, a water connection is provided on the stuffing table and the operator places the casing over the water nozzle and admits a small amount of water prior to threading the casing upon the stuffing horn. Casings treated in accordance with our invention may be placed on the stuffing horn without first admitting a small amount of water to the casing.

The dye absorption properties of the casing are also improved by the present process in that the casings require a smaller concentration of dye to produce the same intensity of color as compared to untreated casings. This is important when the product is labeled by stamping using a dye for the purpose.

In addition to arresting the action of the enzymes by high temperatures, removal by washing, or with chemical agents, the enzymic action can be arrested by exposure of the enzyme treated animal tissue to ultraviolet light having wave lengths between approximately 1800 and 3700 angstroms. Such ultraviolet light inactivates or destroys the proteolytic enzymes employed in the present invention if material containing the enzymes is exposed thereto under conditions providing sufficient intensity of the light and sufficient time of treatment. The preferred ranges, however, are between approximately 2400 and 3000 angstroms as ultraviolet light having a wave length below 2400 angstroms tends to cause ozone formation and as a result thereof to impart a burned protein flavor to meats or other animal tissues. In many cases ultraviolet light having wave length between 1800 and 2400 angstroms can, however, be employed where the nature of the animal tissue or the intensity of the light or time of treatment required to inactivate the enzymes is not sufficient to produce the burned protein flavor referred to. Also, it is possible to carry out the treatment of the animal tissues in atmospheres free of oxygen, such as inert gases, so that no ozone is produced. For practical purposes, however, the range of wave lengths between 2400 and 3000 angstroms is preferred as it is unnecessary to take special precautions to prevent imparting a burned flavor to the burned protein of the animal tissues and several commercial sources of ultraviolet light give relatively high intensity of radiations within this range of wave lengths.

As examples of such sources, certain commercial low pressure mercury arcs yield approximately 95% of their radiation at a wave length of 2537 angstroms, which is directly within the range above given. Such light is, however, substantially monochromatic and improved results are obtained if a wider range of wave length is employed within the preferred range above given. Certain commercial high pressure mercury arcs as well as carbon arcs, particularly if the carbon arc is produced between electrodes containing relatively large quantities of iron or aluminum, give effective radiation within the range of 2400 to 3000 angstroms. In general, these types of arcs considerably exceed this range and a suitable filter is preferably employed therewith. For example, a suitable filter may comprise 5% of benzene or p-xylene in alcohol or hexane. Other known or suitable filters may be employed with any suitable source of ultraviolet light to restrict the wave length of the ultraviolet radiation to within the desired limits.

Effective inactivating action of ultraviolet light is a function of the intensity of the light and the time of treatment. Effective inactivating treatment will usually require between approximately 150 and 10,000 microwatts per square millimeter of radiation within the range above given depending upon factors such as the wave lengths of the light, the type of enzyme being inactivated and the medium in which it is present. Thus the material in which the enzymes are to be inactivated may be treated for a relatively long period of time with a source of ultraviolet light of relatively low intensity or may be treated for a shorter length of time with a source of ultraviolet light of high intensity. The distance of the light from the material to be treated will affect the results since the angle of incidence varies with the distance between the light source and the object. For example, a 360 watt Uviarc ultraviolet light (high pressure mercury arc in quartz) is more efficient in destroying enzyme activity at 15 inches than at 7½ inches. This is due to the fact that the light is more nearly a point source at 15 inches than at 7½ inches, causing the radiation from all parts of the radiator to be more efficient. In addition, the further the light is from the object, the less is the angle of incidence and as the angle of incidence becomes less acute, the radiation becomes more effective. It has been found that, in order to obtain 90% inactivation of a 0.10% papain solution of one millimeter thickness, using a 360 watt Uviarc ultraviolet light at a distance of 7½ inches, a total of about 1,000 microwatts per square millimeter derived radiation within the range of 2,400 to 3,000 angstroms are required. Under the same conditions, except that the distance is 15 inches, the microwatts required are about 500. In the case of 0.025% trypsin solution of one millimeter thickness, using the same 360 watt Uviarc light at a distance of 15 inches, the total microwatts required to secure 90% inactivation is about 7,000 per square millimeter.

The effect of the wave length of ultraviolet light on solutions of certain enzymes such as papain varies substantially. A 20 watt Sterilamp (high pressure mercury arc in quartz) gives off its primary radiations at 2,537 angstroms at which wave length absorption by papain solution is quite low. The energy requirement to inactivate papain is much greater for the Sterilamp than for the Uviarc whose radiations unfiltered cover a relatively wide range. Using Sterilamp at a distance of 5 inches from the material, the total of the microwatts required for 90% inactivation of a 0.10% papain solution is about 9,000 per square millimeter.

In the application of the ultraviolet light treatment to natural casings, hog casings, for example, may be submerged in a 0.10% papain solution for about one hour. The treated casings may then be subjected to radiation from a 360 watt Uviarc ultraviolet light at a distance of 15 inches for about 6 minutes, during which time the total output of microwatts is about 4,000 per square millimeter. Casings so treated generally show a tenderness by penetrometer tests of about 54 as compared to about 74 for the untreated casings.

The ultraviolet light treatment arrests the action of the papain so that substantially no further tenderization accrues subsequent to the ultraviolet light treatment.

Using low intensity radiation will require the product to be exposed to the radiation for relatively long periods. A plurality of sources of ultraviolet light can be mounted in various places in a storage room for the enzyme treated material so that the radiation from the sources will strike all surfaces of the product. The intensity and time of exposure must be such that the energy delivered to the enzyme renders it inactive. Using high intensity sources of radiation, the product may be brought to a suitable lamp or bank of lamps mounted so that the high intensity radiation is directed against all portions of the product containing the enzyme material. Thus the enzyme containing products can be carried continuously past such a bank of lamps or can be placed in a suitable enclosure or even in a storage room and the high intensity radiation applied thereto for a predetermined shorter period of time.

The ultraviolet light inactivation of enzymes is particularly applicable to the treatment of sausage casings either before or after stuffing as such casings after treatment with enzymes for a definite period of time can be readily supported either in a fixed position so that they are exposed to ultraviolet radiation from substantially all directions or may be moved past sources of ultraviolet light in a manner insuring that all portions of the sausage casings are subjected to sufficient intensity to inactivate the enzymes. The treatment of sausage casings and other animal tissues with enzymes and the subsequent inactivation of the enzymes with ultraviolet light has the advantage that the products have not been subjected to elevated temperatures which tend to cook the proteins. Otherwise the products are essentially similar to those produced by enzyme treatment followed by heat inactivation.

The inactivation of enzymes by ultraviolet light is also applicable to the treatment of other animal tissues such as meat. It is intended that any animal tissue may be treated by enzymes and ultraviolet light wherein the radiation could be applied. Generally, the surface of any product can be inactivated by ultraviolet light. In case inactivation is required at depths beyond that at which the radiations will penetrate, the ultraviolet light treatment may be combined with other means of inactivation, for example, chemical inactivation or heat treatment. The ultraviolet light treatment may also be used as a means of control or regulation of the tenderization by the enzymes. For example, the enzyme activity may be arrested by ultraviolet light in certain portions of the material and the enzyme activity continued in other portions.

The herein described method of inactivation of enzymes by ultraviolet light is applicable to both plant and animal enzymes. For example, it is contemplated that the method may be used to inactivate enzymes such as asclepain, papain, ficin, macin, bromelin, mushroom proteinase, trypsin, pepsin, cathepsin, or any proteolytic enzyme, or plant juices containing enzymes, which are suitable for tenderizing animal tissue.

This application is a continuation-in-part of our application Serial No. 490,080 filed June 8, 1943, which is a continuation-in-part of our application Serial No. 425,208 filed December 31, 1941 (United States Patent No. 2,321,625), which in turn was a division of our earlier application Serial No. 382,590 filed March 10, 1941 (United States Patent No. 2,321,623), and which latter application was in turn a continuation-in-part of our application Serial No. 301,957, filed October 30, 1939, now abandoned, which application is a continuation-in-part of our now abandoned application Serial No. 225,566 filed August 18, 1938.

Obviously, many modifications and variations of the invention hereinbefore set forth may be made without departing from the spirit and scope thereof, and therefore only such limitations should be imposed as are indicated in the appended claims.

We claim:

1. A method of preparing animal casings for use in sausage manufacture comprising: subjecting the casings to treatment with a liquid containing a small amount of proteolytic enzyme whereby the enzyme is associated with the said casings and said casings are conditioned for tenderizing, and treating said casings to inhibit the enzymic action prior to complete tenderization.

2. In a method of treating an animal casing employed in sausage products, the improvement comprising: subjecting an animal casing to treatment with a proteolytic enzyme whereby the enzyme is associated with the said casing and the casing is conditioned for tenderizing; and treating the said casing to inhibit the enzymic action thereon prior to complete tenderization, whereby the desired tenderizing of the casing may be subsequently obtained by the action of the enzyme associated therewith.

3. In a method of treating animal casings employed in sausage products, the improvement comprising: applying a proteolytic enzyme to an animal casing whereby the enzyme is associated with the said casing and the casing is conditioned for tenderizing; and treating the acid casing with salt to inhibit the enzymic action thereon prior to complete tenderization, whereby the desired tenderization of the casing may be subsequently obtained by the action of the enzyme associated therewith.

4. In a method of treating an animal casing employed in sausage products, the improvement comprising: subjecting an animal casing to treatment with a proteolytic enzyme whereby the enzyme is associated with the said casing and the casing is conditioned for tenderizing; and treating the said casing to inhibit the enzymic action thereon after the casing is partially tenderized to improve the stuffing properties thereof but prior to complete tenderization, whereby a casing is obtained which may be stored for a prolonged period and subsequently tenderized by the action of the enzyme associated therewith.

5. In a method of treating an animal casing employed in sausage products, the improvement comprising: applying a proteolytic enzyme to an animal casing whereby the enzyme is associated with the said casing and the casing is conditioned for tenderizing; and treating the said casing with salt to inhibit the enzymic action thereon after the casing is partially tenderized to improve the stuffing properties thereof but prior to complete tenderization, whereby a casing is obtained which may be stored for a prolonged period and subsequently tenderized by the action of the enzyme associated therewith.

6. A method of preparing a sausage product which comprises: applying a proteolytic enzyme to an animal casing whereby the enzyme is associated with the said casing and the casing is conditioned for tenderizing; treating the said casing to inhibit the action of the said enzyme on the casing after the enzyme has become associated with the said casing but prior to complete tenderization thereof; and stuffing the treated casing with sausage meat while the enzyme is associated with the said casing, thereby producing a sausage product the casing of which is capable of being subsequently tenderized by the action of the enzyme associated therewith.

7. A method of preparing a sausage product which comprises: applying a proteolytic enzyme to an animal casing whereby the enzyme is associated with the said casing and the casing is conditioned for tenderization; treating the said casing to inhibit the action of the said enzyme on the casing after the enzyme has become associated with the said casing but prior to complete tenderization thereof; stuffing the said casing with sausage meat prior to complete tenderization of the casing while the enzyme is associated therewith; and continuing the inhibiting treatment until the tenderization of the casing is completed by the action of the enzyme associated therewith.

8. A method of preparing a sausage product which comprises: applying a proteolytic enzyme to an animal casing whereby the enzyme is associated with the said casing and the casing is conditioned for tenderization; treating the said casing to inhibit the action of the said enzyme on the casing after the enzyme has become associated with the said casing but prior to complete tenderization thereof; stuffing the treated casing with sausage meat prior to complete tenderization of the casing while the enzyme is associated therewith; and subjecting the stuffed sausage casing to further action of the enzyme associated therewith whereby the toughness of the sausage casing is substantially reduced and the tenderization of the said casing completed.

9. A method of preparing a sausage product which comprises. applying a proteolytic enzyme to an animal casing whereby the enzyme is associated with the said casing and the casing is conditioned for tenderization; treating the said casing with salt to inhibit the action of the said enzyme on the casing after the enzyme has become associated with the casing but prior to complete tenderization thereof; subsequently stuffing the treated casing with sausage meat prior to complete tenderization of the casing after removing the enzyme-inhibiting salt and while the enzyme is associated with the said casing; subjecting the stuffed sausage casing to further action of the enzyme associated therewith whereby the toughness of the sausage casing is substantially reduced and the tenderization of the said casing completed; and finally inactivating the enzyme prior to disintegration of the said sausage casing.

10. A method of preparing a sausage product which comprises: applying a proteolytic enzyme to an animal casing whereby the enzyme is associated with the said casing and the casing is conditioned for tenderizing; treating the said casing to inhibit the action of the said enzyme on the casing after the casing is partially tenderized to improve the stuffing properties thereof but prior to complete tenderization of the said casing; and subsequently stuffing the partially tenderized casing with sausage meat while the enzyme is associated with the said casing, thereby producing a sausage product having a casing the tenderization of which may be subsequently completed by the action of the enzyme associated therewith.

11. A method of preparing a sausage product which comprises: applying a proteolytic enzyme to an animal casing whereby the enzyme is associated with the said casing and the casing is conditioned for tenderizing; treating the said casing to inhibit the action of the said enzyme on the casing after the casing is partially tenderized to improve the stuffing properties thereof but prior to complete tenderization of the said casing; stuffing the said casing with sausage meat prior to complete tenderization of the casing while the enzyme is associated therewith; and maintaining the sausage product having the enzyme associated therewith in an enzyme-inhibiting condition until the tenderization of the casing is completed by the action of the enzyme associated therewith.

12. A method of preparing a sausage product which comprises: applying a proteolytic enzyme to an animal casing whereby the enzyme is associated with the said casing and the casing is conditioned for tenderization; treating the said casing to inhibit the action of the enzyme on the casing after the casing is partially tenderized to improve the stuffing properties thereof but prior to complete tenderization of the said casing; stuffing the treated casing with sausage meat prior to complete tenderization of the casing while the enzyme is associated therewith; and subjecting the stuffed sausage casing to further action of the enzyme associated therewith whereby the toughness of the sausage casing is substantially reduced and the tenderization of the said casing completed.

13. A method of preparing a sausage product which comprises: applying a proteolytic enzyme to an animal casing whereby the enzyme is associated with the said casing and the casing is conditioned for tenderizing; treating the said casing with salt to inhibit the action of the said enzyme after the casing is partially tenderized to improve the stuffing properties thereof but prior to complete tenderization of the casing; subsequently stuffing the partially tenderized casing with sausage meat after removing the enzyme-inhibiting salt from the casing and while the enzyme is associated with the said casing; subjecting the stuffed sausage casing to further action of the enzyme associated therewith by maintaining the sausage casing at an enzyme-activating temperature thereby further tenderizing the sausage casing; and finally inactivating the enzyme prior to disintegration of the said sausage casing.

14. A method of preparing a sausage product which comprises: applying a proteolytic enzyme to an animal casing whereby the enzyme is associated with the said casing and the casing is conditioned for tenderizing; and stuffing the treated casing with sausage meat after the enzyme has become associated with the casing but prior to complete tenderization of the said casing, thereby producing a sausage product having a casing the tenderization of which may be subsequently completed by the action of the enzyme associated therewith.

15. A method of producing a sausage product which comprises: applying a proteolytic enzyme to an animal casing whereby the enzyme is associated with the said casing and the casing is conditioned for tenderization; stuffing the treated casing with sausage meat after the enzyme has become associated with the casing but prior to complete tenderization of the said casing; subjecting the stuffed sausage casing to further action by the enzyme associated therewith whereby the toughness of the sausage casing is substantially reduced and the said casing tenderized, and finally inactivating the enzyme prior to complete disintegration of the said casing.

16. A method of preparing a sausage product which comprises: applying a proteolytic enzyme to an animal casing whereby the enzyme is associated with the said casing and the casing is conditioned for tenderizing; stuffing the treated casing with sausage meat after the enzyme has become associated with the said casing and the casing partially tenderized to improve the stuffing properties thereof but prior to complete tenderization; subjecting the stuffed sausage casing having the enzyme associated therewith to further enzymic action by maintaining the stuffed sausage casing to an enzyme activating temperature thereby further tenderizing the sausage casing; and finally inactivating the enzyme prior to complete disintegration of the said casing.

JOHN M. RAMSBOTTOM.
LEVI SCOTT PADDOCK.

REFERENCES CITED

The following references are of record in the file of this patent:

UNITED STATES PATENTS

| Number | Name | Date |
|---|---|---|
| 2,043,392 | Paddock et al. | June 9, 1936 |
| 2,140,781 | Allen | Dec. 20, 1938 |
| 2,314,313 | Rinehart | Mar. 16, 1943 |
| 2,321,623 | Ramsbottom et al. | June 15, 1943 |
| 2,365,728 | Redemake | Dec. 26, 1944 |

Certificate of Correction

Patent No. 2,454,716.  November 23, 1948.

JOHN M. RAMSBOTTOM ET AL.

It is hereby certified that errors appear in the printed specification of the above numbered patent requiring correction as follows:

Column 6, line 67, for "facin" read *ficin*; column 11, line 65, in the table, right-hand portion thereof, for "112 0" read *112.0*; column 15, line 40, claim 3, for the word "acid" read *said*;

and that the said Letters Patent should be read with these corrections therein that the same may conform to the record of the case in the Patent Office.

Signed and sealed this 5th day of April, A. D. 1949.

[SEAL]

THOMAS F. MURPHY,
*Assistant Commissioner of Patents.*